United States Patent Office 2,843,617
Patented July 15, 1958

2,843,617

DIALKYL PROPYNYL PHOSPHONATES

Samuel Kaufman, Clayton, Mo., assignor to Monsanto Chemical Company, St. Louis, Mo., a corporation of Delaware No Drawing. Application May 31, 1956
Serial No. 588,267

6 Claims. (Cl. 260—461)

This invention relates to new and useful dialkyl propynyl phosphonates and to methods of preparing same.

The new compounds of this invention may be represented by the structure

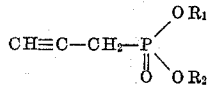

where $R_1$ and $R_2$ are like or unlike alkyl radicals, such as methyl, ethyl, propyl, isopropyl, n-butyl, n-amyl, isoamyl, hexyl, and the like, and isomers thereof.

These new compounds are made by reacting a propargyl halide, such as propargyl bromide or chloride, with a trialkyl phosphite and as illustrative of their preparation is the following:

Example I

In a suitable reaction vessel equipped with a condenser attached to a Dry Ice trap are mixed 59.5 parts by weight of propargyl bromide and 83 parts by weight of triethyl phosphite, and the mix heated to 90–95° C. with agitation. The reaction is permitted to seek its own temperature level (about 180° C.) while collecting the evolved ethyl bromide. As the temperature rose the solution darkened and thereto was added a small amount of hydroquinone. The mass is heated to 192° C. to assure removal of ethyl bromide, cooled, and distilled at 10 mm. pressure. The colorless mobile liquid distillate so obtained is diethyl propynyl phosphonate.

Example II

Employing the procedure of Example I but replacing triethyl phosphite with an equimolecular amount of trimethyl phosphite, there is obtained dimethyl propynyl phosphonate.

Example III

Employing the procedure of Example I but replacing triethyl phosphite with an equimolecular weight of tri-n-butyl phosphite and replacing propargyl bromide with an equimolecular weight of propargyl chloride, there is obtained di-n-butyl propynyl phosphonate.

Example IV

Employing the procedure of Example I but replacing triethyl phosphite with an equimolecular amount of tri-isoamyl phosphite, there is obtained di-isoamyl propynyl phosphonate.

Example V

In a suitable reaction vessel equipped with a condenser attached to a Dry Ice trap is admixed 47.6 parts by weight of propargyl bromide and 33.2 parts by weight of triethyl phosphite, and the mixture heated to reflux. The mix is refluxed for about 1.4 hours while permitting ethyl bromide and unreacted propargyl bromide to distill over. At the end of this period a small amount of hydroquinone is added and the mass heated and distilled at 0.8 mm. The collected distillate at 78°–80° C./0.8 mm. is diethyl propargyl phosphonate (yield approximately 53.3% of theory).

In the process of making the new compounds of this invention it is preferred that an excess (e. g. 10–100% by weight excess of theory) of the propargyl halide be employed, and that the reaction take place at the reflux temperature of the system. It is particularly preferred that a polymerization inhibitor be incorporated in the reaction mass which is substantially inert with respect to the components of the reacting mass and the final product. While an inert organic solvent may be employed in the process of this invention, such has not been found necessary.

The dialkyl propynyl phosphonates of this invention have been found to be effective in the control of noxious vegetation, particularly narrow-leafed plants, such as crab grass and blue grass. In applying the compounds of this invention as herbicides conventional techniques may be employed, for example a 0.1 to 2% by weight solution of the dialkyl propynyl phosphonate in an organic solvent therefor, such as a hydrocarbon solvent, may be sprayed on the noxious narrow-leafed vegetation. Such solutions may be admixed with emulsifying agents and then admixed with water to provide oil-in-water emulsions for spraying undesirable vegetation.

While this invention has been described with respect to certain embodiments it is to be understood that it is not so limited and that variations and modifications thereof may be made which are obvious to those skilled in the art without departing from the spirit or scope of this invention.

What is claimed is:
1. Dialkyl propynyl phosphonates of the structures

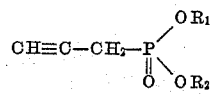

where $R_1$ and $R_2$ are alkyl radicals containing 1 to 6 carbon atoms.
2. Dimethyl propynyl phosphonate.
3. Diethyl propynyl phosphonate.
4. Di-n-butyl propynyl phosphonate.
5. Di-isoamyl propynyl phosphonate.
6. The process of making the compounds of claim 1 which comprises reacting a propargyl halide with a trialkyl phosphite wherein the respective alkyl groups contain from 1 to 6 carbon atoms under refluxing conditions and in the presence of a polymerization inhibitor.

No references cited.